US012095585B2

(12) United States Patent
Ji et al.

(10) Patent No.: US 12,095,585 B2
(45) Date of Patent: Sep. 17, 2024

(54) CONFERENCE SYSTEM, AND METHOD AND DEVICE OF PUSHING CONFERENCE INFORMATION

(71) Applicants:BEIJING BOE DISPLAY TECHNOLOGY CO., LTD., Beijing (CN); BOE TECHNOLOGY GROUP CO., LTD., Beijing (CN)

(72) Inventors: Xu Ji, Beijing (CN); Dacheng Zhou, Beijing (CN); Quan Long, Beijing (CN); Chao Yu, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 124 days.

(21) Appl. No.: 17/310,614

(22) PCT Filed: Nov. 24, 2020

(86) PCT No.: PCT/CN2020/131158
§ 371 (c)(1),
(2) Date: Aug. 13, 2021

(87) PCT Pub. No.: WO2022/109784
PCT Pub. Date: Jun. 2, 2022

(65) Prior Publication Data
US 2022/0200816 A1 Jun. 23, 2022

(51) Int. Cl.
*H04L 12/18* (2006.01)

(52) U.S. Cl.
CPC ...... *H04L 12/1895* (2013.01); *H04L 12/1818* (2013.01); *H04L 12/1822* (2013.01)

(58) Field of Classification Search
CPC ............. H04L 12/1895; H04L 12/1818; H04L 12/1822
See application file for complete search history.

(56) References Cited

U.S. PATENT DOCUMENTS

| 2011/0182415 | A1* | 7/2011 | Jacobstein | ............ | H04M 3/563 |
| | | | | | 379/202.01 |
| 2011/0196955 | A1* | 8/2011 | Odaka | ..................... | H04L 41/06 |
| | | | | | 709/223 |

(Continued)

FOREIGN PATENT DOCUMENTS

| CN | 101848217 A | 9/2010 |
| CN | 103426078 A | 12/2013 |

(Continued)

*Primary Examiner* — Raqiul A Choudhury
(74) *Attorney, Agent, or Firm* — Kinney & Lange, P.A.

(57) ABSTRACT

A conference system is provided, including: a server, wherein the server is configured to reserve a conference room according to a conference application information received, wherein the conference application information includes an information of a target conference room; and wherein the server is further configured to determine a conference terminal device associated with the target conference room and push a conference information associated with the conference application information to the conference terminal device to display the conference information. A method and a device of pushing conference information are also provided.

14 Claims, 3 Drawing Sheets

(56) References Cited

U.S. PATENT DOCUMENTS

| | | | | |
|---|---|---|---|---|
| 2012/0170740 A1* | 7/2012 | Lee | ................... | H04L 9/0618 |
| | | | | 380/28 |
| 2016/0357489 A1* | 12/2016 | Dong | ................... | H04N 7/142 |
| 2017/0006162 A1* | 1/2017 | Bargetzi | ............... | G06Q 10/109 |
| 2017/0272578 A1* | 9/2017 | Shiota | ................... | H04W 4/06 |
| 2018/0324393 A1* | 11/2018 | Ryan | ................... | H04N 7/188 |
| 2019/0052636 A1* | 2/2019 | Wang | ................... | H04L 9/3242 |

FOREIGN PATENT DOCUMENTS

| | | | |
|---|---|---|---|
| CN | 104361464 | A | 2/2015 |
| CN | 107220719 | A | 9/2017 |
| CN | 109088926 | A | 12/2018 |
| CN | 110198326 | A | 9/2019 |
| CN | 110519545 | A | 11/2019 |
| CN | 110798824 | A | 2/2020 |
| CN | 111416829 | A | 7/2020 |
| CN | 111652599 | A | 9/2020 |
| JP | 2008268998 | A | 11/2008 |

* cited by examiner

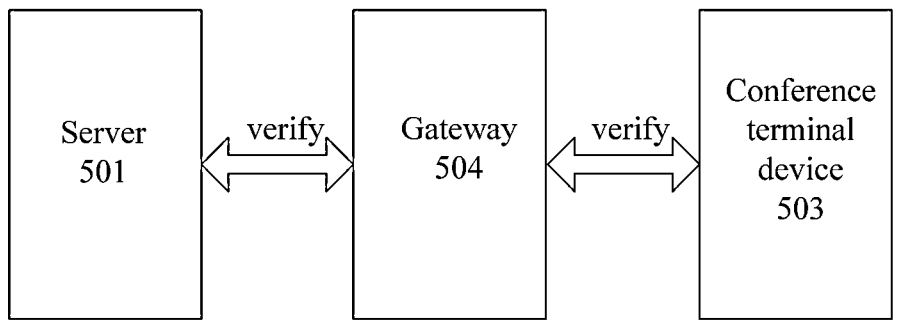

FIG. 5

| Web terminal | Mobile phone terminal | Intelligent terminal |
|---|---|---|
| Login system | Login system | Bind terminal |
| Import participant information | Import participant information | Push conference information |
| Bind conference room hardware | Bind conference room hardware | Push conference schedule |
| Reserve conference room | Reserve conference room | Conference reminder |
| Inquiry conference room | Inquiry conference room | |
| Send participant email | Send participant email | |
| Push information content | Push information content | |
| Upload file | Upload file | |
| Transmit conference minute | Insert personal schedule | |
| | Conference speech | |
| | Download file | |

FIG. 6

CONFERENCE SYSTEM, AND METHOD AND DEVICE OF PUSHING CONFERENCE INFORMATION

CROSS-REFERENCE TO RELATED APPLICATION(S)

This application is a Section 371 National Stage Application of International Application No. PCT/CN2020/131158, filed on Nov. 24, 2020, entitled "CONFERENCE SYSTEM, AND METHOD AND DEVICE OF PUSHING CONFERENCE INFORMATION", which is incorporated herein by reference in their entirety.

TECHNICAL FIELD

The present disclosure relates generally to the Internet of Things, and in particular to a conference system, a method, and a device of pushing conference information.

BACKGROUND

Conferences constitute a major communication method for issuing information, communicating, negotiating, cooperating, and disseminating technologies. As public collaboration is increasing, the conference has gradually developed towards large scale. At the same time, more and more high-tech methods have been introduced for conducting conferences. For example, television conferences or remote conferences may be implemented by means of communication, and information generated and feedback during the conference may be displayed by means of various devices that could play sounds or display images. Therefore, higher requirements for organization management and information management of conferences have been put forward.

SUMMARY

The present disclosure provides a conference system, a method and a device of pushing conference information.

According to a first aspect of the present disclosure, a conference system is provided, including: a server, wherein the server is configured to reserve a conference room according to a conference application information received, wherein the conference application information includes an information of a target conference room; and wherein the server is further configured to determine a conference terminal device associated with the target conference room, and push a conference information associated with the conference application information to the conference terminal device to display the conference information.

In some embodiments, the conference system further includes: an input device, wherein the input device is in communication connection with the server, and the input device is configured to input the conference application information and the conference information to the server.

In some embodiments, the server is further configured to: register one or more conference terminal devices in the conference system and associate the one or more conference terminal devices with the conference room.

In some embodiments, the server is further configured to: match at least one of the one or more conference terminal devices as a target terminal device according to a type of the conference information; bind the conference information with the target terminal device matched; and push the conference information bound to the target terminal device.

In some embodiments, the server matches an electronic table card as the target terminal device in a case of the conference information being participant information.

In some embodiments, the server is further configured to: obtain a table card ID of the electronic table card matched; obtain an ID of a participant according to the participant information; and bind the ID of the participant with the table card ID of the electronic table card.

In some embodiments, in a case that there are a plurality of participants and a plurality of electronic table cards, the server is further configured to: randomly bind IDs of the plurality of participants with table card IDs of the plurality of electronic table cards one-to-one.

In some embodiments, the server is further configured to: transmit a binding information to the electronic table cards by broadcasting, wherein the binding information indicates a binding relationship between the IDs of the participants and the table card IDs of the electronic table cards.

In some embodiments, the server is further configured to: modify a participant information corresponding to an ID of a participant in response to an operation of a user; determine an electronic table card according to the binding relationship between the IDs of the participants and the table card IDs of the electronic table cards; and transmit the participant information modified to the electronic table card determined.

In some embodiments, the conference application information includes a conference starting time, and the server is further configured to: transmit the participant information to the electronic table card at the conference starting time or at a scheduled time before the conference starting time.

In some embodiments, when the server is configured to transmit the participant information to the electronic table card at the scheduled time before the conference starting time, the server is further configured to: determine whether the target conference room is occupied or not at the scheduled time before the conference starting time; and transmit the participant information to the electronic table card after the target conference room is free in a case that the target conference room is occupied.

In some embodiments, the system further includes a gateway, and the gateway is configured to: verify the conference terminal device, so as to create a connection between the server and a verified conference terminal device.

In some embodiments, verifying the conference terminal device includes: connecting with the conference terminal device; receiving a terminal device whitelist from the server, and matching the conference terminal device connected with a device ID in the terminal device whitelist; and determining that the conference terminal device, when matching the device ID in the terminal device whitelist, is the verified conference terminal device.

In some embodiments, the connecting the conference terminal device includes: receiving a heartbeat signal from the conference terminal device; and determining that the conference terminal device is connected to the gateway in a case of receiving the heartbeat signal from the conference terminal device.

In some embodiments, the conference information includes a conference prompt information, a conference reminder information, a participant information, a conference outline information and a presentation material information.

According to a second aspect of the present disclosure, a method of pushing conference information is provided, including: reserving a conference room according to a conference application information received, wherein the conference application information includes an information of a target conference room; determining a conference terminal device associated with the target conference room; and pushing a conference information associated with the conference application information to the conference terminal device to display the conference information.

According to a third aspect of the present disclosure, a device of pushing conference information is provided, including: a memory configured to store a program instruction; and a processor configured to execute the program instruction, so as to implement the method of pushing conference information according to the second aspect of the present disclosure.

BRIEF DESCRIPTION OF THE DRAWINGS

In order to clearly describe the technical solutions of the present disclosure, the following will briefly introduce the drawings used in the embodiments of the present disclosure. The drawings in the following description are only some embodiments of the present disclosure. For those skilled in the art, other drawings may be obtained based on the drawings without creative work. In the drawings:

FIG. 5 illustrates an example process of verifying a conference terminal device according to the embodiments of the present disclosure; and FIG. 6 illustrates a process of managing a conference through an example of a system of pushing conference information according to the embodiments of the present disclosure.

DETAILED DESCRIPTION OF EMBODIMENTS

Figure 1:
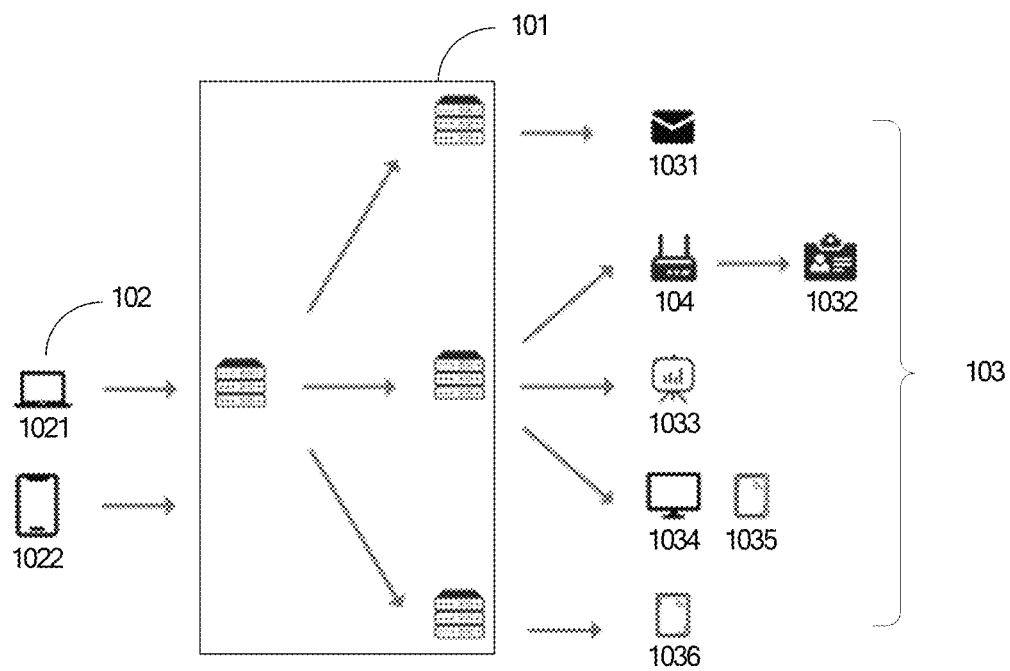
FIG. 1 illustrates a schematic structural diagram of a system of pushing conference information according to the embodiments of the present disclosure.

In order to make the objectives, technical solutions and advantages of the embodiments of the present disclosure clearer, the technical solutions in the embodiments of the present disclosure will be clearly and completely described below in conjunction with the drawings in the embodiments of the present disclosure. The described embodiments are a part of the embodiments of the present disclosure, but not all of the embodiments of the present disclosure. Based on the described embodiments of the present disclosure, all other embodiments obtained by those skilled in the art without creative work are within the protection scope of the present disclosure. It should be noted that throughout the drawings, the same elements are denoted by the same or similar reference numerals. In the following description, some specific embodiments are only used for descriptive purposes, and should not be construed as having any limitation on the present disclosure, but are merely examples of the embodiments of the present disclosure. When it may cause confusion in the understanding of the present disclosure, conventional structures or configurations will be omitted. It should be noted that the shape and size of each component in the drawings do not reflect the actual size and ratio, but merely illustrate the content of the embodiment of the present disclosure.

Unless otherwise defined, the technical or scientific terms used in the embodiments of the present disclosure should have usual meanings understood by those skilled in the art. The "first", "second" and similar words used in the embodiments of the present disclosure do not denote any order, quantity, or importance, but are only used to distinguish different components.

In addition, in the description of the embodiments of the present disclosure, the term "electrically connected" may indicate that two components are directly electrically connected, or may indicate that two components are electrically connected via one or more other components. In addition, the two components may be electrically connected or coupled in a wired or wireless manner.

FIG. 1 illustrates a schematic structural diagram of a conference system 100 according to the embodiments of the present disclosure. As shown in FIG. 1, the conference system 100 according to the embodiments of the present disclosure includes a server 101 and an input device 102. User may use the conference system 100 to control and manage various stages of the conference.

As shown in FIG. 1, the server 101 may include a single server or a server group. According to the embodiments, the server 101 is used to reserve a conference room according to a conference application information received. The conference application information includes an information of a target conference room. According to the embodiments, the server 101 is further used to determine a conference terminal device associated with the target conference room, and push a conference information associated with the conference application information to the conference terminal device to display the conference information.

As shown in FIG. 1, the input device 102 is in communication connection with the server 101, the input device 102 is used to receive an input data and transmit the received input data to the server 101 for storing and processing by the server 101. According to the embodiments, the input data may include the conference application information and the conference information. As shown in FIG. 1, the input device 102 includes a personal computer 1021 and a mobile terminal 1022. According to the embodiments, it is possible to log in to a web terminal of the conference system 100 through a website address on the personal computer 1021 and use the web terminal to perform various operations of the conference system 100. In some embodiments, it is possible to log in to the conference system 100 through a small program on the mobile terminal and use the small program to perform various operations of the conference system 100.

The server 101 receives the conference application information and the conference information through the input device 102. According to the embodiments, the conference application information includes the information of the target conference room. For example, a conference initiator submits a conference application through the web terminal of the personal computer 1021 or the small program of the mobile terminal 1022. For example, the conference initiator inputs a conference time, a conference subject, a participant, a speaker and other information. The conference initiator determines the target conference room to be used for the conference according to the above information, and proposes a reservation for the target conference room.

As shown in FIG. 1, the server 101 is also connected to a plurality of conference terminal devices 103. The server 101 may reserve the conference room according to the conference application information received, and the server may determine, from the plurality of conference terminal devices 103, at least one conference terminal device associated with that target conference room. In this manner, the received conference information may be transmitted to different conference terminal devices 103 and the conference terminal devices 103 may display the received conference information. In the above process, the server 101 implements a management of entire process of the conference by controlling and managing a plurality of different types of conference information generated in each stage of the conference.

According to the conference system 100 of the embodiments of the present disclosure, various conference information required during the conference is managed and controlled, different conference information is pushed to different conference terminal devices for display, so as to assist the conference. This achieves paperless conference management, and is conducive to saving resources and practicing the concept of green and environmental protection.

As shown in FIG. 1, the server 101 may be connected to a plurality of input devices 102 and the plurality of conference terminal devices 103 in a wired or wireless manner, so as to perform wired or wireless communication with the plurality of input devices 102 and the plurality of conference terminal devices 103. Depending on communication methods supported and adopted by each input device 102 and each conference terminal device 103, the wired communication manner includes but is not limited to RS232 serial port, RS485 bus, universal serial bus (USB), asymmetric digital subscriber loop (ASDL), wired local area network (LAN), etc. The wireless communication manner includes but is not limited to RF433/315M, Bluetooth, Wi-Fi, Zigbee, Z-ware, cellular mobile communication 2G, 3G, 4G, 5G, etc.

As shown in FIG. 1, the plurality of conference terminal devices 103 include an email 1031, an electronic table card 1032, an electronic whiteboard 1033, a display 1034, an electronic door card 1035 and other intelligent information display devices 1036. It may be understood that the input devices 102 and the conference terminal devices 103 shown in FIG. 1 are only examples. The input device 102 may be any device that may input data representing various information to the server 101, the conference terminal device 103 may be any device capable of posting information and displaying the posted information in a specific manner. In addition, in the embodiments of the present disclosure, a device that supports e-mail is also included in the system 100 of pushing conference information as a broad conference terminal device. E-mails may be displayed on computers or mobile terminals (for example, mobile phones), and a method of pushing the e-mails may rely on third-party service providers without being restricted by hardware carriers such as computers and mobile terminals.

The system 100 of pushing conference information according to the embodiments of the present disclosure may be used to manage a progress of the conference. According to the embodiments, the conference initiator or conference organizer may reserve the target conference room according to the conference time, a conference location, a number of participants, and the conference subject. The server 101 may generate a notification or reminder event according to the acquired conference application information, so as to transmit the conference notification or reminder information to relevant participants at an appropriate time. According to the embodiments, the conference initiator or conference organizer or the participant may input a participant information to the server 101 through the plurality of input devices 102, and the participant information may be used for a layout of a conference venue. For example, the participant information may be used to allocate seats, set up table cards and so on. According to the embodiments, before the conference starts, a participant intended to speak at the conference may input information such as an outline of the conference and a presentation material of the conference to the server 101 through the plurality of input devices 102. In addition, after the server 101 determines the participant and obtains the participant information, the conference reminder information may be pushed to the determined participant before the conference starts, so as to remind the participant to avoid the participant forgetting to attend or being late.

According to the system 100 of pushing conference information of the embodiments of the present disclosure, the server 101 may push, organize and manage various different types of conference information in preparing the conference, conference information during a process of the conference and conference information after the conference. The conference information includes the conference prompt information, the conference reminder information, the participant information, the conference outline information and the presentation material information.

According to the embodiments, the server 101 may push different conference information to different conference terminal devices 103 to control different processes of the conference respectively.

According to the embodiments, after the server 101 reserves the target conference room according to the conference application information, the conference prompt information may be generated according to the conference application information, and the conference prompt information is pushed to the electronic door card 1035. The electronic door card 1035 may be an electronic signage set at a specific location of the conference venue, such as an electronic doorplate of a conference room. According to the embodiments, the conference prompt information may include the starting time and ending time of the conference. After the server 101 pushes the starting time and ending time of the conference to the electronic door card 1035, the conference prompt information may be displayed through the electronic door card 1035. Through the conference prompt information, it is possible to note a situation regarding whether the conference venue is occupied or not during the above time period, so as to prevent conflicts caused by repeated reservations for the conference venue. According to the embodiments, the conference prompt information may also include a conference attribute information. After the server 101 pushes the conference attribute information to the electronic door card 1035, the conference attribute information may be displayed through the electronic door card 1035. According to the embodiments, the conference attribute information may include a conference-related subject. For example, a "new display device" is displayed on the electronic door card 1035. Then, it may be noted that the conference is a conference introducing related technologies on the new display device through the content displayed on the electronic door card 1035. For another example, the conference attribute information may include a speaker of the conference. For example, "Speaker XXX" is displayed on the electronic door card 1035. Then, the conference-related subject may also be noted through the display content on the electronic door card 1035. In this way, the participant may find the conference venue through the content on the electronic door card 1035.

According to the embodiments, the server 101 may generate conference reminder information according to the conference application information, and the server 101 transmits the conference reminder information to each participant attending the conference via email 1031, so as to notify the participant about the relevant information of the conference or to remind the participant. This is convenient for the participant to make some preparations in advance and prevent the participant from forgetting to attend the conference or being late. In addition, the server 101 may also push the conference reminder information to any other smart information display device 1036. For example, the server 101 may push the conference reminder information to an IoT (Internet of Things) device such as an electronic picture screen, and the server 101 may also push the conference reminder information to a mobile terminal device such as a smart phone.

Further, according to the embodiments, during the process of the conference, the server 101 may display related materials such as a PPT document to the participant through display devices such as an electronic whiteboard 1033 and a display 1034.

In order to implement the foregoing process of information pushing, the server 101 may provide a data interface compatible with a plurality of existing service frameworks internally. According to the embodiments, the server 101 may provide a data interface with an email server of a third-party service provider for sending emails, so as to send emails to a predetermined object via the service provided by the email server, for example, to transmit the conference reminder information to each participant, and to transmit a conference minute and a conference note after the conference. According to the embodiments, the server 101 may provide a data interface with a specific IoT service framework. For example, there may be a specific IoT system for the plurality of conference terminal devices 103 provided in a specific conference venue. The specific IoT system may be used to call and set the plurality of conference terminal devices 103. After providing the data interface between the server 101 and the specific IoT system, the server 101 may call and set the conference terminal devices in the conference venue by means of the specific IoT service framework. As shown in FIG. 1, in the IoT service framework, each conference terminal device 103 is accessed to the IoT service framework and connected to the server 101 through a gateway 104. The IoT service framework is mainly responsible for the management and control of an IoT device (such as the conference terminal device 103) and the gateway 104, including a transmission and reception of information.

The server 101 that implements information pushing based on the existing service framework is easy to implement, but not convenient to transplant, which limits the scope of an application. According to the embodiments of the present disclosure, a general pushing framework may be built in the server 101 for pushing the conference information to the plurality of terminal devices 103 including IoT devices. The method of pushing conference information according to the embodiments of the present disclosure may be directly implemented by the server 101, or may be implemented by setting a separate device of pushing conference information in the system 100 of pushing conference information.

Figure 2:
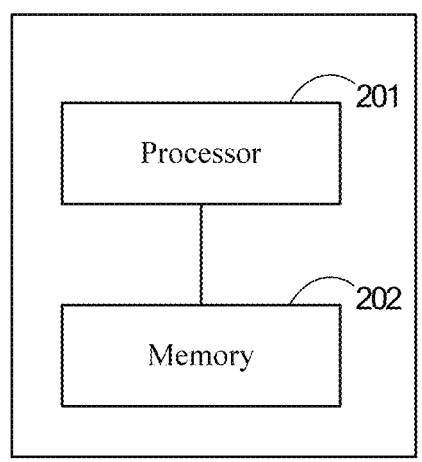
FIG. 2 illustrates a schematic structural diagram of a device of pushing conference information according to the embodiments of the present disclosure.

FIG. 2 illustrates a schematic structural diagram of a device 200 of pushing conference information according to the embodiments of the present disclosure. As shown in FIG. 2, the device 200 of pushing conference information includes a processor 201 and a memory 202. A machine-readable instruction is stored in the memory 202, and the processor 201 may execute the machine-readable instruction to implement the method of pushing conference information according to the embodiments of the present disclosure.

The memory 202 may include a non-volatile memory or a volatile memory, such as an electrically erasable programmable read-only memory (EEPROM), a flash memory and the like.

Various components in the device 200 of pushing conference information according to the embodiments of the present disclosure may be implemented by a variety of devices, and the devices include but are not limited to: analog circuit devices, digital circuit devices, digital signal processing (DSP) circuits, programmable processors, application-specific integrated circuits (ASIC), field programmable gate arrays (FPGA), programmable logic devices (CPLD), etc.

Figure 3:
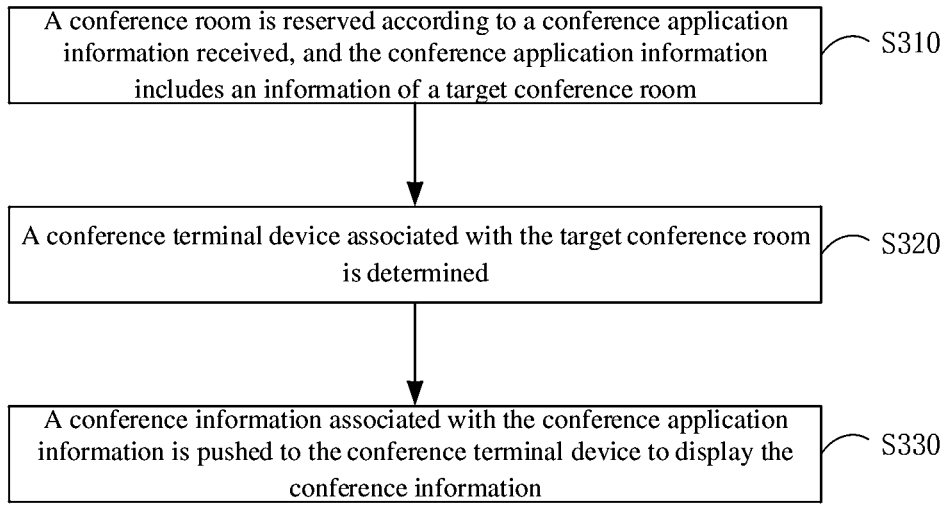
FIG. 3 illustrates a flowchart of a method of pushing conference information according to the embodiments of the present disclosure.

FIG. 3 illustrates a flowchart of a method 300 of pushing conference information according to the embodiments of the present disclosure. As shown in FIG. 3, the method 300 of pushing conference information includes following steps.

In step S310, a conference room is reserved according to a conference application information received, and the conference application information includes an information of a target conference room.

In step S320, a conference terminal device associated with the target conference room is determined.

In step S330, a conference information associated with the conference application information is pushed to the conference terminal device to display the conference information.

According to the embodiments, the conference application information and the conference information are received through an input device. The conference application information may be input by an initiator or host of the conference, and the conference application information is provided during a conference organization stage. The conference information includes but is not limited to a conference prompt information, a conference reminder information, a participant information, a conference outline information and a presentation material information. According to the foregoing embodiments, the conference information may be any conference-related information generated during a layout of a conference venue, during a process of the conference and after the conference.

According to the method of pushing conference information of the embodiments of the present disclosure, various conference information involved during the layout of the conference venue, during the process of the conference, and after the conference may be organized and managed, which implements an efficient organization and management of the conference and implements a paperless conference, thus saving resources.

According to the embodiments, a server may match at least one of the conference terminal devices as a target terminal device according to a type of the conference information, the server binds the conference information with the target terminal device matched, and the server pushes the conference information bound to the target terminal device.

According to the embodiments, when the conference information is the participant information, the server may match an electronic table card as the target terminal device. When the conference information is the conference prompt information, the server may match an email and an electronic door card as the target terminal device. When the conference information is the conference outline information, the server may match at least one of an electronic table card, an electronic whiteboard and a display as the target terminal device. It may be understood that the foregoing embodiments are only examples, and the conference information may be pushed to a specific conference terminal device according to the type of the obtained conference information and a main function of the conference information. The following is an example of pushing the participant information to the electronic table card to illustrate the process of binding the conference information with the selected target terminal device.

According to the embodiments, the user manages the conference through the web terminal on the personal computer or the small program on the mobile terminal. According to the embodiments, on a user graphical interface of the above-mentioned personal computer or mobile terminal, the electronic table card is bound by clicking "allocate table card". According to the embodiments, the user may click the allocation button behind each table card on the user graphical interface, and the server may allocate each electronic table card one by one in response to the user's operation. According to the embodiments, the user may also click all allocation buttons on the user graphical interface, and the server responds to the user's operation and allocates the connected electronic table cards in one click.

According to the embodiments, the process of binding the conference information with the matched target terminal device may include following operations. A table card ID (identification) of the electronic table card matched is obtained. An ID of a participant is obtained according to the participant information, such as a name of the participant. The ID of the participant is bound with the table card ID of the electronic table card. In the embodiments of the present disclosure, there may be a plurality of participants, and there may be a plurality of electronic table cards. The server may randomly bind IDs of the plurality of participants with table card IDs of the plurality of electronic table cards one-to-one. According to the embodiments of the present disclosure, there is no need to assign electronic table cards to specific seating positions in advance, and there is no need to confirm seating arrangements of the participants in advance. That is, according to the embodiments of the present disclosure, there is no need to determine a one-to-one correspondence between the participants and seats in advance, thereby simplifying the information pushing process of the electronic table cards.

According to the embodiments, after binding names of the participants with the table card IDs of the electronic table cards, the participant information associated with the names of the participants may correspond one-to-one with the table card IDs of the electronic table cards. Therefore, the electronic table cards may obtain other information included in the participant information such as an identity, position, work experience and other information of the participants according to the one-to-one correspondence.

Figure 4:
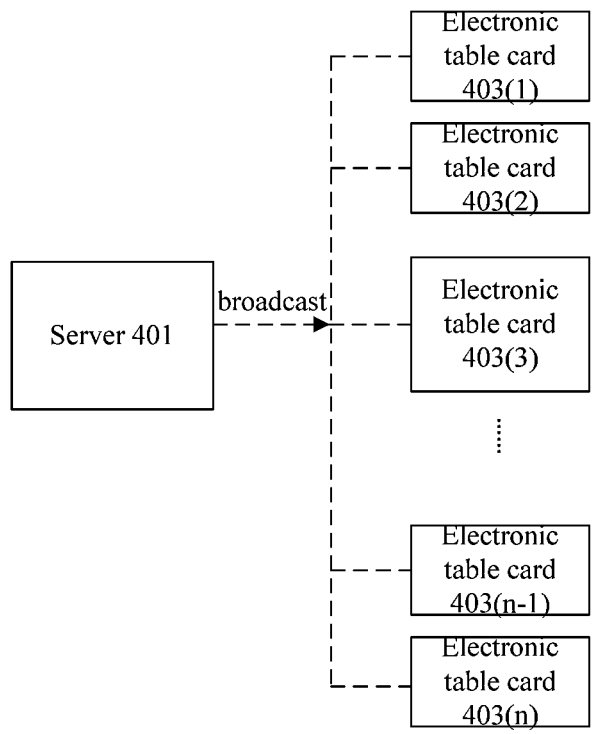
FIG. 4 illustrates an example process of pushing a participant information to an electronic table according to the embodiments of the present disclosure.

FIG. 4 illustrates an example process of pushing a participant information to an electronic table card according to the embodiments of the present disclosure. As shown in FIG. 4, a server (or a device of pushing conference information) 401 transmit a binding information to the electronic table cards 403 by broadcasting. The binding information indicates a binding relationship between the IDs of the plurality of participants and the table card IDs of the plurality of electronic table cards. FIG. 4 shows n electronic table cards 403, where n is a natural number greater than 1, and each electronic table card 403 has a unique table card ID. When the server 401 broadcasts the binding information to each electronic table card 403, each electronic table card 403 receives the binding information according to its own table card ID. Then, the electronic table cards 403 obtains names of the participants according to the binding information and obtains other information included in the participant information. After receiving the participant information, the electronic table cards 403 refresh a displayed content according to the participant information. Next, the electronic table cards 403 displaying the participant information may be moved to designated seats, so that the participant information or the participants may correspond to the designated seats. There is a one-to-one correspondence between the participant information and the seats, so as to implement an arrangement and a layout of the conference venue.

According to the embodiments, the server may correspondingly modify the display of the electronic table cards according to user's modification of the participant information. According to the embodiments, the server may modify a participant information corresponding to an ID of a participant in response to a user's operation. The server determines an electronic table card according to the binding relationship between the IDs of the participants and the table card IDs of the electronic table cards, and the server transmits the participant information modified to the electronic table card determined.

According to the embodiments, the user may modify the participant information that has been displayed on the electronic table card on the user graphical interface. According to the embodiments, the user first finds an entry corresponding to the ID of the participant to be modified, the entry includes all participant information to be displayed on the electronic table card. According to the embodiments, the user may modify other information of the participant without changing the ID of the participant. For example, the user may find a relevant entry of participant "a" on the user graphical interface. Assuming that an ID of the participant "a" is XXa, the user may modify other information of the participant "a" without changing XXa. For example, the identity information of the participant "a" may be changed from the host of the conference to the speaker of the conference.

Further, according to the embodiments, in the case of modifying the ID of the participant, previously set binding relationship between the IDs of the participants and the electronic table cards for showing the participant information is not changed. Therefore, the server may find the electronic table card corresponding to the ID of the participant (i.e., XXa) according to the previously determined binding relationship, and the server transmits the modified participant information to the electronic table card. After receiving the updated participant information, the electronic table card refresh the display of the electronic table card according to the updated information. For example, a new identity information of the participant "a" is displayed as the speaker of the conference.

According to the embodiments of the present disclosure, whether it is to modify display information of the electronic table card or it is to transmit newly generated binding information to a new electronic table card, there is no need to confirm a correspondence between positions of the electronic table cards and positions of the participants (seats arrangement). In this way, a flexibility of venue layout may be improved, and a lot of time may be saved for preparation work.

Further, according to the embodiments of the present disclosure, the conference application information may also include a conference starting time, so the server may determine a time and a method of pushing the participant information to the electronic table cards according to the conference starting time.

According to the embodiments, the server may transmit the participant information to the electronic table card at the conference starting time or at a scheduled time before the conference starting time. Further, according to the embodiments, an operation of the server transmitting the participant information to the electronic table card at the scheduled time before the conference starting time includes following steps. It is determined whether the target conference room is occupied or not at the scheduled time before the conference starting time. When the target conference room is occupied, the participant information is transmitted to the electronic table cards after the target meeting room is free. For example, in order to complete a layout of the conference before the conference starts, the server may transmit the participant information to the electronic table card at the scheduled time before the conference starting time. For example, the server may transmit the participant information to the electronic table card 10 minutes before the conference starts. In this case, the server may first determine whether the target conference room is occupied or not, so as to ensure that an operation of refreshing the electronic table card may not affect a currently ongoing conference. If the target conference room is occupied, the participant information fails to be pushed to the electronic table card. According to the embodiments, the server again determines whether the target conference room is occupied at a next scheduled time, until it is determined that the target conference room is free. Then, the participant information will be pushed to the electronic table card. For example, if the server determines that the conference room is occupied 10 minutes before the conference starts, the server may determine again whether the conference room is occupied 3 minutes later (that is, 7 minutes before the conference starts). And so on, the participant information is pushed to the electronic table card until it is determined that the target conference room is free, or until the conference starting time.

According to the embodiments, before the server 101 establishes a communication connection with the plurality of conference terminal devices 103, the plurality of conference terminal devices 103 to be connected are also verified. Only verified conference terminal devices 103 may connect to the server 101, and the conference terminal devices 103 that are not verified may not connect to the server 101. Therefore, a security of the connection between the server 101 and the conference terminal devices 103 is ensured, thereby ensuring the information security during the conference. According to the foregoing embodiments, the gateway (gateway 104 as shown in FIG. 1) for communication based on a private protocol is provided between the server 101 and some of the plurality of conference terminal devices 103. FIG. 5 illustrates an example process of verifying a conference terminal device according to the embodiments of the present disclosure.

As shown in FIG. 5, a server 501 first transmits a terminal device whitelist to a gateway 504. The terminal device whitelist includes an ID of a terminal device which is allowed to be connected. Next, a matching between the conference terminal device and the device ID in the terminal device whitelist is completed at the gateway 504. Finally, the matched conference terminal device is determined to be verified. According to the embodiments, the terminal device whitelist may be defined by the user by recording the conference terminal device on the user graphical interface. According to the embodiments, the user operates on the user graphical interface, so as to register the conference terminal device to the conference system, and associate the conference terminal device with the conference room. The conference system adds the device ID of the conference terminal device registered in the conference system to the terminal device whitelist.

As shown in FIG. 5, the gateway 504 receives the terminal device whitelist from the server 501 on one hand, and the gateway 504 connects to the online conference terminal device 503 on other hand. Then, the gateway 504 matches the connected conference terminal device 503 with the device ID in the terminal device whitelist, and the gateway 504 determines that the conference terminal device 503 is verified when the conference terminal device 503 matches the device ID in the terminal device whitelist. After the verified conference terminal device 503 is determined, the server 501 may establish a connection with the verified conference terminal device 503. If the verification fails, access of the conference terminal device 503 is prohibited. As shown in FIG. 5, the gateway 504 connects each conference terminal device 503 to a pushing frame of the server 501 through a transport layer security (TLS), and data encryption is performed on all two-way data transmissions. Remotely distributed data uses RSA digital signature to prevent data from being tampered with.

According to the embodiments, the gateway 504 may receive a heartbeat signal from the conference terminal device 503 at regular intervals. If it is confirmed that the heartbeat signal from the conference terminal device 503 is received, it may be determined that the conference terminal device 503 is online, that is, the conference terminal device 503 is connected to the gateway 504 properly. If the heartbeat signal from the conference terminal device 503 is not received, it may be determined that the conference terminal device 503 is offline, that is, the conference terminal device 503 is not connected to the gateway 504. The gateway 504 only verifies the conference terminal device 503 connected to the gateway 504, and the gateway 504 does not verify the conference terminal device 503 that is not connected to the gateway 504.

A two-way authentication is performed between the gateway 504 and the server 501, an authority of the conference terminal device 503 is controlled through the whitelist. Each conference terminal device 503 has a separate key for it to transmit connection requests. After the connection is successful, the key becomes invalid to avoid repeated propagation. The gateway 504 ignores an invalid key to prevent the gateway 504 from being illegally hijacked.

According to the embodiments, both the electronic table card and electronic door card have unique device IDs, which are respectively used as identity authentication information of the electronic table card and the electronic door card, and a data flow may be traced. According to the embodiments, a permission control is performed through the whitelist, and a connection request of the conference terminal device 503 is authenticated. The connection request transmitted by the conference terminal device 503 includes a key that is used only once for verification.

According to the embodiments of the present disclosure, a non-public private protocol is used for a communication between the gateway 504 and the conference terminal device 503, that is, all instructions, timing, frames, and verification methods are kept secret, so as to effectively prevent intrusion. According to the embodiments, the gateway 504 uses an uplink to connect to the server 501, for example, the gateway 504 is connected to the server 501 through a wired network (for example, an RJ45 interface). According to the embodiments, the gateway 504 uses a downlink to connect to the conference terminal device 503, for example, the gateway 504 connects the electronic table card through a 433M private protocol. For example, for EPD display products, when the gateway 504 transmits instructions to the conference terminal device such as the electronic table card and electronic door card, data transmission is carried out by scanning according to resolution, tricolor without gray scale, from left to right and from top to bottom. At the same time, a reserved parameter of table header, a middle of the table and an end of the table are respectively encrypted. When the conference terminal device receives information, a transcoding verification is performed. The table header field, table middle information and table ending information all have their own validation rules, when the verification information is incorrect, the conference terminal device will not perform operations based on the received information.

According to the embodiments, verifying the plurality of conference terminal devices includes following operations. A plurality of connection creation requests are received from the plurality of conference terminal devices. Device IDs of the plurality of conference terminal devices are extracted from the plurality of connection creation requests. The extracted device IDs of the conference terminal devices are compared with the device IDs in a preset terminal device whitelist. In a case that the extracted device IDs of the conference terminal devices match the device IDs in the preset terminal device whitelist, it is determined that the conference terminal devices are verified.

According to the embodiments, verifying the plurality of conference terminal devices further includes following operations. In a case that a connection has been created with a conference terminal device that matches the device ID in the preset terminal device whitelist, other conference terminal devices having the same device ID among the plurality of conference terminal devices that request to create the connection are determined as not verified.

As described above, according to the embodiments of the present disclosure, the identity of conference terminal devices requesting for access may be bidirectionally verified via the gateway, and the private protocol is used for communication between the gateway and the conference terminal devices, thereby effectively ensuring a safe data transmission.

FIG. 6 illustrates a process of managing a conference through an example of a system of pushing conference information according to the embodiments of the present disclosure. As shown in FIG. 6, the system includes a Web terminal that may be used through a computer device or a device capable of Internet access. A creator or initiator of the conference or the conference organizer with specific permissions may perform all business logics such as conference creation, information entry, conference sign-in, file upload, file projection, conference minute, conference reservation, conference notice, etc., on a Web page. After the above operations, the server analyzes content and transmits the conference notice, the conference minute, etc. to the participant via an Internet email service. Each participant may access the Web page through a mobile terminal. A mobile phone program may synchronize functions of the web page, and the mobile phone program may connect to the gateway through the same framework as the Web terminal. The system pushes the conference information to different conference terminal devices according to different types of the conference information.

When making a conference reservation, first a conference room is selected according to a conference time in a conference application information, and electronic table cards and electronic door card in the conference room are automatically selected. Besides, a display of the electronic door card is refreshed according to a conference prompt information, the electronic door card of the conference room is typeset according to a system pushing content, and a usage situation and a conference schedule is refreshed. The system may not only check the usage of the conference room, but also check the conference schedule of a certain participant, which avoids repeated conferences when the conference is scheduled, and ensures that the participant may attend the conference. Then, names of the participants are added. After adding the names of the participants, for internal personnel, the system may automatically associate a participant information. For external personnel, a participant information should be uploaded. According to the embodiments, in user management, information of the internal personnel of the company is imported, including information such as user's name, phone number and position. The system supports individual import and batch import, and the system also supports interface docking. For information with external customer, it is possible to choose directly adding the external customers, and the external customer's name, company, position and other information may be added as required. Then, a conference notification is automatically transmitted to a mailbox of the participant according to a defined template style, and the notification may also be pushed to an electronic drawing screen at the same time. A file to be shared may be uploaded to the system and stored as a conference material. A conference outline may be uploaded at the same time, and the conference outline may also be added to the system.

In addition, the system will automatically push the name, position and other information of the participant to the electronic table cards in the conference room according to the order of the participant information. According to the embodiments, in conference room management, the electronic table cards placed in the conference room is randomly bound. When there is a conference in the current conference room, the electronic table cards may be randomly bound with the participant information. Before the conference starts, by clicking "one-click push", the participant information will be randomly transmitted to the electronic table cards bound to the conference room. When a number of the electronic table cards is insufficient or the electronic table card need to be moved, a new electronic table card may be bound to the current conference room in the conference room management or the original electronic table card may be unbound, then the electronic table cards may be used in next step. After the conference starts, if the participant information changes, a content of the participant may be edited and submitted again for the table card used by the participant. If there is a problem with the current table card or the current table card is out of power, the table card ID may be changed and the participant information may be transmitted to a new table card. When the table card is submitted again, a template and a refreshed content on front and back of the table card may be changed at will. Different table cards may display different content, especially for different participants.

After recording each participant, the system may randomly bind the names of the participants to a list of all table cards bound to the conference room through one-click allocation. Each participant forms an ID and binds the ID to a random table card, the gateway transmits all binding information to the table card terminal in batches by broadcasting. The table card receives the participant ID bound to its own ID, and after refreshing information, a conference server will place seats of the table cards according to a content displayed on the table cards.

Fifteen minutes before the conference starts, the system pushes the conference reminder to a smart device such as an electronic drawing screen for dual reminders. Before the conference starts, the system automatically pushes the conference material stored in the system to the electronic whiteboard according to the name of the conference room and a number of the electronic whiteboard in the conference room. After the whiteboard is turned on, the material published in the conference may be automatically read.

During the conference, each participant may post their opinions and suggestions in the system. Each conference serves as a separate page, and each participant may log in with their own accounts to transmit relevant opinions. Only one participant will be set as a recorder. An interface of the recorder will have a function of transmitting conference minute to e-mail. After other people's opinions are submitted, the opinions may be displayed on a page for everyone's reference. When the recorder sends the email, the opinions of all participants are provided as reference opinions. Only the participant of the current conference has an authority to view an interface of the current conference.

After the conference is over, the conference minute may be directly added on the current conference page. After clicking a "submit", the conference minute may not only be viewed in the system, but also be transmitted to a mailbox of each participant in accordance with a written template. The conference note and suggestion issued by all participants in the conference are attached, and the conference material is also automatically transmitted as attachments. After the conference is over, if no extension of the conference is applied for in the system, the electronic whiteboard will automatically delete the stored conference material. The electronic table card and electronic door card are refreshed into blank templates, which protects the privacy of the participants and the security of the conference material.

According to the embodiments of the present disclosure, the system for managing the plurality of types of conference terminal devices is provided, the electronic whiteboard/ smart terminal hardware may automatically download the conference material, and the background automatically transmits the conference minute to the mailbox of the participant for a global solution of the conference management system, which implements paperless conference office, improves work efficiency and saves unnecessary expenses and work.

In addition, the embodiments disclosed herein may be implemented on a computer program product. More specifically, the computer program product is a product as follows. The product includes a computer-readable medium with computer program logic encoded thereon. When the product is executed on a computing device, the computer program logic provides related operations to implement the above technical solutions of the present disclosure. When the product is executed on at least one processor of the computing system, the computer program logic causes the processor to perform the operations (methods) described in the embodiments of the present disclosure. The arrangement of the present disclosure is typically provided as software, codes and/or other data structures arranged or encoded on a computer-readable medium such as an optical medium (such as a CD-ROM), a floppy disk or a hard disk, or as software, codes and/or other data structures such as one or more firmware or microcode on a ROM or RAM or PROM chip, or downloadable software images, shared databases, etc. in one or more modules. Software or firmware or such the arrangement may be installed on the computing device, so that one or more processors in the computing device execute the technical solutions described in the embodiments of the present disclosure.

The above detailed description has illustrated the embodiments by using schematic diagrams, flowcharts, and/or examples. In the case where such schematic diagrams, flowcharts, and/or examples include one or more functions and/or operations, those skilled in the art should understand that, each function and/or operation in such schematic diagrams, flowcharts, or examples may be implemented individually and/or jointly through various structures, hardware, software, firmware, or substantially any combination thereof.

Although the present disclosure has been described with reference to a few typical embodiments, it should be understood that the terms used are illustrative and exemplary rather than restrictive. Since the present disclosure may be implemented in various forms without departing from the spirit or essence of the disclosure, it should be understood that the above-mentioned embodiments are not limited to any of the foregoing details, but should be interpreted broadly within the spirit and scope defined by the appended claims. Therefore, all changes and modifications falling within the scope of the claims or their equivalents shall be covered by the appended claims.

What is claimed is:

1. A conference system, comprising:
    a server, wherein the server is configured to reserve a conference room according to a conference application information received, wherein the conference application information comprises an information of a target conference room; and
    an input device, wherein the input device is communicatively connected with the server, and the input device is configured to input the conference application information and conference information to the server,
    wherein the server is further configured to determine a conference terminal device associated with the target conference room, the conference terminal device is configured to receive information provided by the input device, and the server is further configured to push the conference information associated with the conference application information to the conference terminal device to display the conference information,
    wherein the server is further configured to: register one or more conference terminal devices in the conference system and associate the one or more conference terminal devices with the conference room, and
    wherein the server is further configured to:
        match at least one of the one or more conference terminal devices as a target terminal device according to a type of the conference information; and
        after determining the target terminal device based on the matching, bind the conference information with the target terminal device matched; and push the conference information bound to the target terminal device.

2. The system of claim 1, wherein, the server matches an electronic table card as the target terminal device in a case of the conference information being participant information.

3. The system of claim 2, wherein the server is further configured to:
obtain a table card ID of the electronic table card matched;
obtain an ID of a participant according to the participant information; and
bind the ID of the participant with the table card ID of the electronic table card.

4. The system of claim 3, wherein in a case that there are a plurality of participants and a plurality of electronic table cards, the server is further configured to:
randomly bind IDs of each of the plurality of participants with table card IDs of the plurality of electronic table cards, one-to-one.

5. The system of claim 4, wherein the server is further configured to:
transmit a binding information to the electronic table cards by broadcasting, wherein the binding information indicates a binding relationship between the IDs of the participants and the table card IDs of the electronic table cards.

6. The system of claim 5, wherein the server is further configured to:
modify a participant information corresponding to an ID of a participant in response to an operation of a user;
determine an electronic table card according to the binding relationship between the IDs of the participants and the table card IDs of the electronic table cards; and
transmit the participant information modified to the electronic table card determined.

7. The system of claim 3, wherein the conference application information comprises a conference starting time, and the server is further configured to:
transmit the participant information to the electronic table card at the conference starting time or at a scheduled time before the conference starting time.

8. The system of claim 7, wherein, when the server is configured to transmit the participant information to the electronic table card at the scheduled time before the conference starting time, the server is further configured to:
determine whether the target conference room is occupied or not at the scheduled time before the conference starting time; and
transmit the participant information to the electronic table card after the target conference room is free in a case that the target conference room is occupied.

9. The system of claim 1, wherein the system further comprises a gateway, and the gateway is configured to:
verify the conference terminal device, so as to create a connection between the server and a verified conference terminal device.

10. The system according to claim 9, wherein verifying the conference terminal device comprises:
connecting with the conference terminal device;
receiving a terminal device whitelist from the server, and matching the conference terminal device connected with a device ID in the terminal device whitelist; and
determining that the conference terminal device, when matching the device ID in the terminal device whitelist, is the verified conference terminal device.

11. The system of claim 10, wherein the connecting the conference terminal device comprises:
receiving a heartbeat signal from the conference terminal device; and
determining that the conference terminal device is connected to the gateway in a case of receiving the heartbeat signal from the conference terminal device.

12. The system of claim 1, wherein the conference information comprises a conference prompt information, a conference reminder information, a participant information, a conference outline information and a presentation material information.

13. A method of pushing conference information, comprising:
receiving a conference application information and conference information;
reserving a conference room according to the conference application information received, wherein the conference application information comprises an information of a target conference room;
determining a conference terminal device associated with the target conference room, wherein the conference terminal device receives information provided by the input device;
pushing the conference information associated with the conference application information to the conference terminal device to display the conference information;
registering one or more conference terminal devices in the conference system and associating the one or more conference terminal devices with the conference room;
matching at least one of the one or more conference terminal devices as a target terminal device according to a type of the conference information; and
after determining the target terminal device based on the matching, binding the conference information with the target terminal device matched;
and pushing the conference information bound to the target terminal device.

14. A device of pushing conference information, comprising:
a memory configured to store a program instruction; and
a processor configured to execute the program instruction, so as to implement operations of pushing conference information, the operations comprising:
receiving a conference application information and conference information;
reserving a conference room according to the conference application information received, wherein the conference application information comprises an information of a target conference room;
determining a conference terminal device associated with the target conference room, wherein the conference terminal device receives information provided by the input device; and
pushing the conference information associated with the conference application information to the conference terminal device to display the conference information,
wherein the operations further comprises:
registering one or more conference terminal devices in the conference system and associating the one or more conference terminal devices with the conference room;
matching at least one of the one or more conference terminal devices as a target terminal device according to a type of the conference information; and
after determining the target terminal device based on the matching, binding the conference information with the target terminal device matched; and pushing the conference information bound to the target terminal device.

* * * * *